(12) United States Patent
Burtz

(10) Patent No.: US 8,294,466 B2
(45) Date of Patent: Oct. 23, 2012

(54) SCALED PLOTS OF ELECTROMAGNETIC DATA

(75) Inventor: Olivier M. Burtz, Wimbledon (GB)

(73) Assignee: ExxonMobil Upstream Research Company, Houston, TX (US)

( * ) Notice: Subject to any disclaimer, the term of this patent is extended or adjusted under 35 U.S.C. 154(b) by 610 days.

(21) Appl. No.: 12/597,733

(22) PCT Filed: Apr. 3, 2008

(86) PCT No.: PCT/US2008/004342
§ 371 (c)(1),
(2), (4) Date: Oct. 26, 2009

(87) PCT Pub. No.: WO2008/156517
PCT Pub. Date: Dec. 24, 2008

(65) Prior Publication Data
US 2010/0065278 A1    Mar. 18, 2010

Related U.S. Application Data

(60) Provisional application No. 60/934,519, filed on Jun. 14, 2007.

(51) Int. Cl.
*G01V 3/08* (2006.01)
(52) U.S. Cl. ............................... 324/338; 324/365; 702/7
(58) Field of Classification Search .................. 324/338, 324/365; 702/7
See application file for complete search history.

(56) References Cited

U.S. PATENT DOCUMENTS

| 6,545,471 | B2 | 4/2003 | Wollin | 324/303 |
| 2006/0197534 | A1 | 9/2006 | Green et al. | 324/348 |
| 2009/0067546 | A1* | 3/2009 | Willen | 375/316 |
| 2010/0332198 | A1* | 12/2010 | Wahrmund et al. | 703/2 |

FOREIGN PATENT DOCUMENTS

| WO | WO2006/096328 | 9/2006 |
| WO | WO2007/092070 | 8/2007 |

OTHER PUBLICATIONS

Constable & Srnka, *Geophysics* 72, WA3-WA12 (Mar.-Apr. 2007).
Ellingsrud, S. et al., *The Leading Edge* 21, 972-982, (2002).
EP Search Report No. RS 115597, dated Dec. 11, 2007, 2 pages.
PCT International Search & Written Opinion, dated Jul. 8, 2008, 6 pages.

* cited by examiner

*Primary Examiner* — Jay Patidar
(74) *Attorney, Agent, or Firm* — ExxonMobil Upstream Research Company Law Dept.

(57) ABSTRACT

Method for improving frequency-domain (1505), controlled-source electromagnetic data readability and interpretability in hydrocarbon prospecting by mapping a scaled amplitude or the relative amplitude (or phase) of the electromagnetic field in a scaled offset–scaled frequency plane (1510). The preferred mapping space uses the offset times the square-root of the frequency as the X-axis and the square-root of the frequency as the Y-axis. The preferred way to scale the amplitude of the electric field is to multiply it by the frequency to the power of −1.5. Resistive anomalies in the data may be identified by comparing negative offset data (or data relative to a reference) to positive offset data (1515). The location and size of a potentially hydrocarbon-bearing resistive body may be estimated from the position of the anomaly on the map (1520).

25 Claims, 14 Drawing Sheets

SCALED PLOTS OF ELECTROMAGNETIC DATA

CROSS-REFERENCE TO RELATED APPLICATIONS

This application is a National Stage entry under 35 U.S.C. 371 of PCT/US2008/004342 that published as WO 2008/156517 and was filed on Apr. 3, 2008 and claims the benefit of U.S. Provisional application 60/934,519 which was filed on 14 Jun. 2007.

FIELD OF THE INVENTION

The invention relates generally to the field of geophysical prospecting, and more particularly to electromagnetic surveying. Specifically, the invention is a method of mapping controlled source electromagnetic survey data to enhance identification of resistive anomalies that potentially are caused by hydrocarbon formations.

BACKGROUND OF THE INVENTION

Since about the year 2000, Controlled Source ElectroMagnetism ("CSEM") has grown from the research stage to commercial applications for oil and gas marine exploration (Constable & Srnka, Geophysics 72, WA3-WA12 (March-April 2007)). Typically, in offshore CSEM, a vessel tows a submerged CSEM source (also called transmitter) above the sea floor. Electric and/or magnetic fields are recorded at receivers lying on the sea floor. Conventionally, negative offsets correspond to the distances between the transmitter locations and the receiver when the transmitter is approaching the receiver. Positive offsets correspond to the distances between the receiver and the transmitter locations when the transmitter is moving away from the receiver. Processing transforms the recorded time series of the electric and magnetic fields into frequency domain data at discrete frequencies. The high frequencies in the source signal are attenuated in their journey from source to receiver more quickly than the low frequencies. Thus, the high frequencies do not penetrate as deep as the low frequencies, but, in the other hand, the resolution of the low frequency data is poorer. The decay of the electric or magnetic fields with offset is controlled by the resistivity of the subsurface. A conductive earth induces a more rapid decay. Resistivity anomalies like oil or gas accumulations produce anomalously slower decays. CSEM interpretation consists in detecting and making sense of those anomalies.

With increasing experience around the world, it has appeared that the earth resistivity structure is more complicated than initially anticipated. More data are required to reduce the interpretation ambiguity. Nowadays, it is common to use denser surveys (more lines and more receivers) and several frequencies to improve lateral and vertical resolution. The technical problem addressed by the present invention is how to overcome the daunting problem of displaying a huge amount of data in a meaningful way.

It is difficult to detect the presence of an anomaly from a first glance at conventional parametric plots such as FIGS. 1A-B, which show the survey data recorded at one receiver from one line of towed transmitter. The X-axis (i.e. the horizontal axis) corresponds to the distance between the receiver and the transmitter locations (offsets). The location of the receiver corresponds to the X=0 line. The Y-axis (i.e. the vertical axis) of FIG. 1A corresponds to the amplitude of the electric field (note the logarithmic scale) and the Y-axis of FIG. 1B corresponds to the phase of the electric fields. Magnetic field data would yield similar pictures. The parameter in FIGS. 1A-B is frequency. (Several frequencies can be extracted from typical survey data.) Data for six frequencies ranging from 0.125 Hz (101) to 2 Hz (102) are shown (arrow 103 indicating the direction of increasing frequency), but many more frequencies can be extracted from waveforms used in modern surveys. In the case of FIGS. 1A-B, there is a known, small anomaly that extends to the right (positive offsets) of the receiver, 600 meters below the sea floor. At a first glance it is difficult to tell that the right sides of the plots look more resistive, or any different at all, than the left sides. Plotting several frequencies only increases the confusion on the plot.

Since the data interpreter is looking for anomalies, it is convenient to estimate or simulate the normal, i.e. background, electro-magnetic response and to compare the recorded data to this reference. FIGS. 2A-C show the variation of the electric field at four receivers (the tip locations of the inverted "V's" correspond to receiver locations, also indicated by reference number 205) at 3 different frequencies (0.125 Hz for FIG. 2A, 0.25 Hz for FIG. 2B and 2 Hz for FIG. 2C) along one tow line. The darker points correspond to the amplitude of the recorded fields and the lighter-shade lines to the simulation of a reference earth, without anomaly (background simulation). From the high frequency data (2 Hz, FIG. 2C), it is obvious that the measured data are above the simulated curves on the right side of the plot (201). This indicates a resistivity anomaly. A close examination of the lower frequency plots (FIGS. 2A-B) also show a more resistive character on the right sides of the plots (202) and (203), but the response is much less obvious (lack of resolution). This way of displaying data is obviously not very satisfactory and can be very confusing if many receivers and frequencies are considered.

The picture can be simplified by considering only the ratio between the observed data and the reference (S. Ellingsrud, et al., *The Leading Edge* 21, 972-982, (2002)). FIGS. 3A-C show the ratio of the actual data amplitude to the reference amplitude for the same four receivers (1, 2, 3 and 4) at three frequencies (the same frequencies as in FIGS. 2A-C) along a tow line. The receiver reference number is also used to indicate the amplitude ratio curve corresponding to that receiver. Left of receiver 4 (region 301), the ratio is very close to 1, i.e. there is no anomaly. Right of receiver 4 the maximum ratio varies from greater than 2 at 2 Hz (best resolution, region 302) to smaller than 1.25 at 0.125 Hz (lowest resolution, region 303). It may be noted that the high frequency data do not extend as far as the low frequency data because they are more quickly attenuated and rapidly fall below the noise level. The edge of the resistivity anomaly is located right below receiver 4 (the anomaly extends to the right), but the ratio is not significantly greater than one at the location of receiver 4. Accurately picking the edge of the anomaly is difficult. Three different plots are required to show the information at the three different frequencies. Plotting all data together on one figure would make a very confusing picture.

Other publications dealing with improved ways of displaying or interpreting CSEM data include US Patent Publication US/2006/0197534 and PCT International Publication WO 2006/096328.

SUMMARY OF THE INVENTION

In one embodiment, the invention is a hydrocarbon prospecting method for displaying electromagnetic field data from a controlled source electromagnetic survey of a subsurface region to enhance identification of resistive anomalies in the subsurface region, thereby locating resistive bodies causing the anomalies, comprising:

(a) decomposing electromagnetic data from at least one survey receiver into frequency domain, and selecting amplitude or phase data corresponding to at least two frequencies (step 1505 in the flow chart of FIG. 15);

(b) plotting a quantity representing the selected electromagnetic field data represented on the plot by contours or color scale on a coordinate plane where the axes are corresponding scaled frequency and scaled offset (source-receiver separation), with scale factors being chosen to produce substantially vertical (parallel to frequency axis) contours in offset ranges not impacted by resistive anomalies (step 1510);

(c) identifying one or more resistive anomalies from the plot, for example by comparing positive offset data to negative offset data (step 1515); and (d) estimating location of a resistive body and potential hydrocarbon source that is causing an anomaly from location of the anomaly on the plot relative to location of the survey receivers (step 1520).

BRIEF DESCRIPTION OF THE DRAWINGS

The present invention and its advantages will be better understood by referring to the following detailed description and the attached drawings in which.

The invention will be described in connection with its preferred embodiments. However, to the extent that the following detailed description is specific to a particular embodiment or a particular use of the invention, this is intended to be illustrative only, and is not to be construed as limiting the scope of the invention. On the contrary, it is intended to cover all alternatives, modifications and equivalents that may be included within the scope of the invention, as defined by the appended claims.

DETAILED DESCRIPTION OF EXAMPLE EMBODIMENTS

The present invention is a method for improving CSEM data readability and interpretability by mapping a scaled amplitude or the relative amplitude (or phase) of the electromagnetic field in a scaled offset–scaled frequency plane. The preferred mapping space uses the offset times the square-root of the frequency as the X-axis and the square-root of the frequency as the Y-axis. The preferred way to scale the amplitude of the electric field is to multiply it by the frequency to the power of $-1.5$.

Figure 1A:
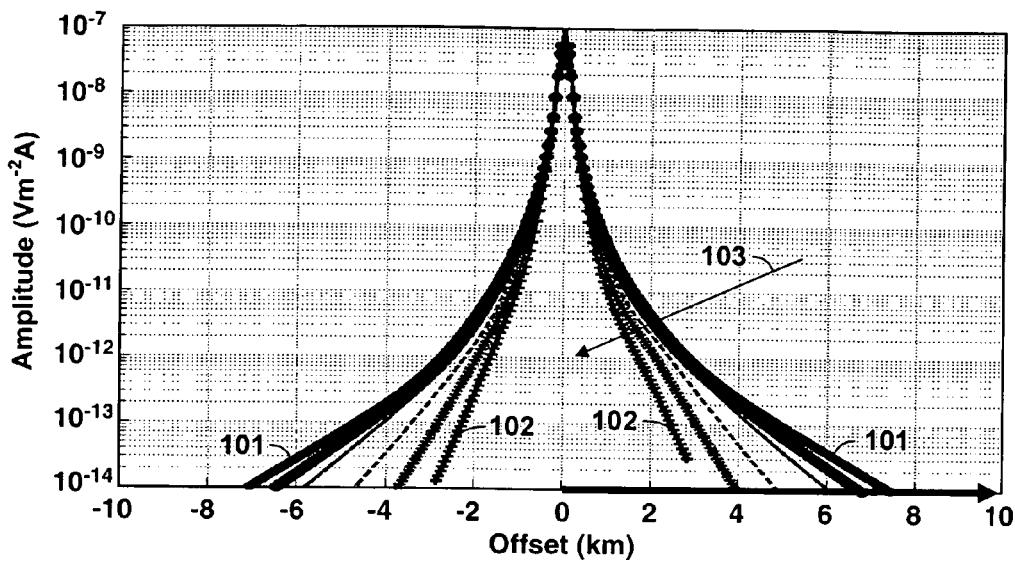
FIGS. 1A-B are conventional parametric plots of amplitude and phase data from a single receiver, traditionally used for interpreting CSEM data.
Figure 1B:
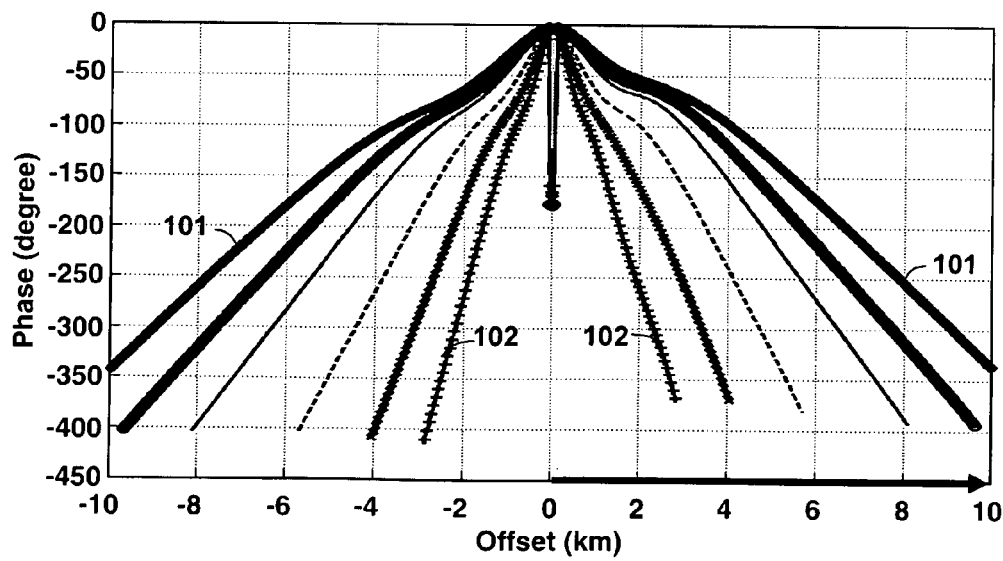

As shown on FIG. 1B, the curves of the phase of electromagnetic field versus offset are very different at different frequencies, even if they are recorded over a homogenous medium (negative offsets in FIG. 1B). It is not easy to detect the difference in the phase curves that is induced by a resistivity anomaly. It is disclosed in PCT International Publication No. WO2007/092070 that instead of plotting phase vs. offset as is typically done, if the same phase data is plotted versus the offset multiplied by the square root of the frequency, then the family of parametric curves such as in FIG. 1B collapse to a single curve 401 in a homogenous medium as shown in FIG. 4B, and that the resistivity anomaly that was virtually undetectable in FIG. 1B causes a prominent difference in the curves at 402.

Figure 4A:
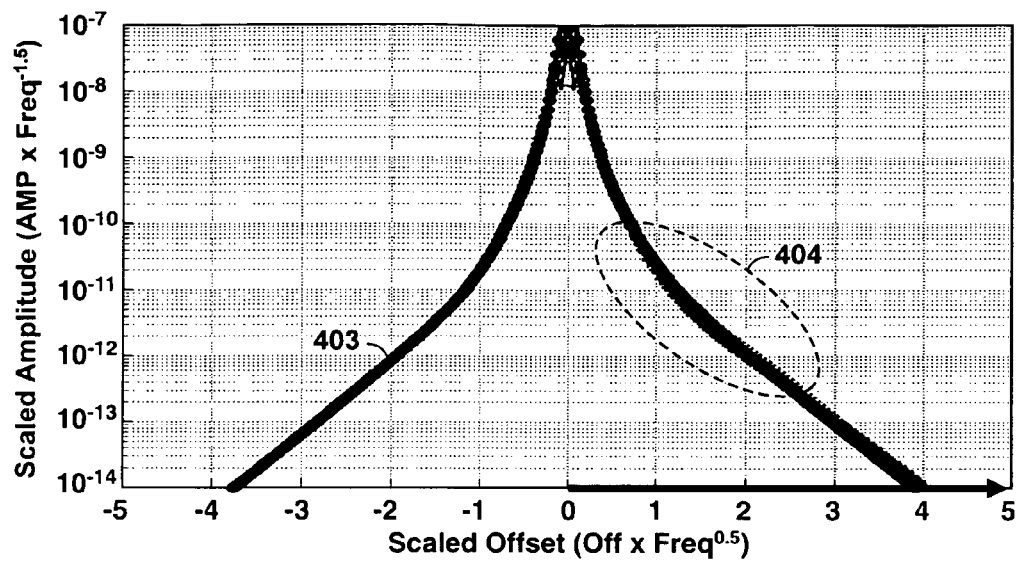
FIG. 4A is a plot of scaled amplitude vs. scaled offset for multiple frequencies according to the present invention.
Figure 4B:
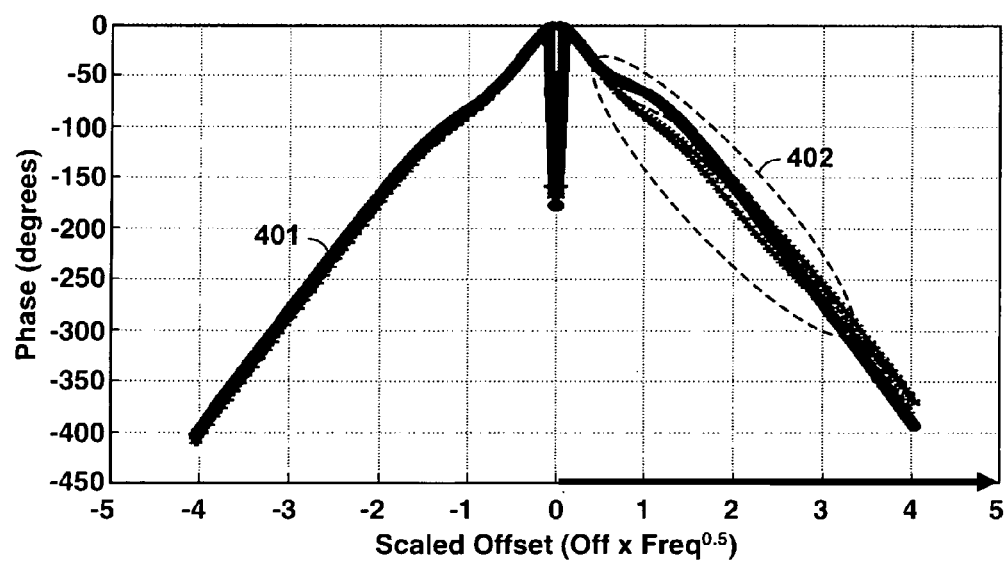
FIG. 4B is a plot of phase vs. scaled offset for multiple frequencies according to Willen's method.

A discovery of the present invention is that a similar collapsing effect is observed in the amplitude vs. scaled offset plots if the amplitude is multiplied by the frequency raised to power $-1.5$ as indicated by collapsed curve 403 in FIG. 4A. If a resistive anomaly is present, as it is in the data used for FIGS. 1A-B and 4A-B, it produces a smaller effect 404 for the amplitude curves than for the phase curves (402). Nevertheless, the anomaly can be detected in FIG. 4A whereas it would be very difficult to detect in FIG. 1A.

Figure 5:
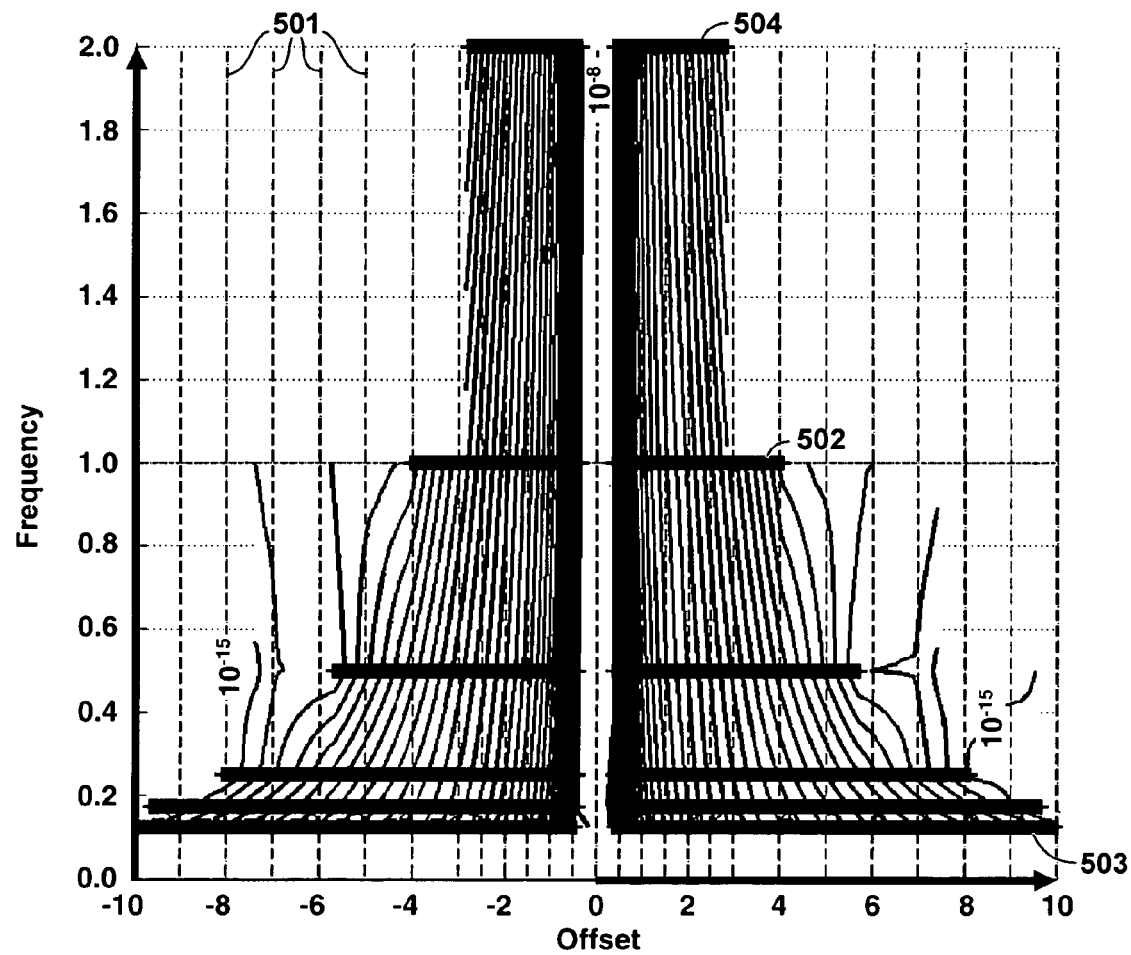
FIG. 5 is an amplitude contour map in offset-frequency space.

In FIG. 5, the amplitude of the electromagnetic field of FIG. 1A is contoured in the Offset–Frequency plane. Amplitude is the parameter in this parametric plot instead of frequency. A similar picture would be observed for the phase. Constant offset lines are shown by vertical broken lines 501. Thick, black lines such as 502 parallel to the offset axis (X-axis) indicate the six frequencies where actual data are present, from 0.125 Hz (503) to 2 Hz (504). An obvious advantage of FIG. 5 compared to FIG. 1A is that many frequencies can be added to the picture without obscuring it. However any difference between the left side (negative offsets) of the picture (no anomaly) and the right side (resistive anomaly is present) remains unclear. On both sides of the zero-offset line, the contour lines of the amplitude (or the phase) are curved. The contours represent amplitude values varying from $10^{-15}$ V/A·m$^2$ at the large offsets to $10^{-8}$ V/A·m$^2$ at offsets close to zero.

Figure 6:
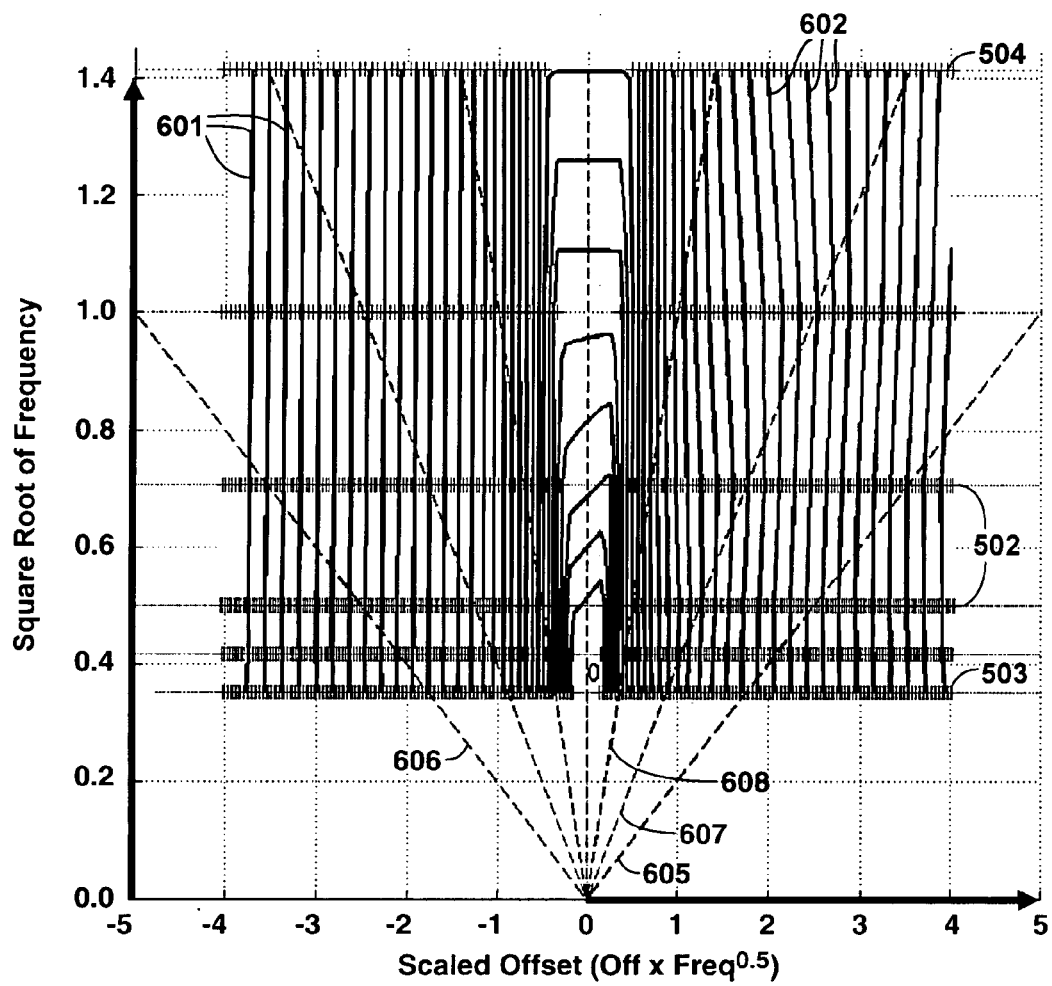
FIG. 6 is a scaled amplitude contour map in scaled offset/scaled frequency space.

However, if the same amplitude data are multiplied by the frequency raised to the negative 1.5 power and are contoured in the Scaled Offset (Offset×square-root of frequency)–Scaled Frequency (Square root of frequency) plane, the difference between both sides becomes obvious, as shown on FIG. 6. In this plane, constant offset lines are displayed as thin, oblique broken lines; e.g., 605 corresponds to an offset of +5 km, 606 to $-5$ km, 607 to +3 km, 608 to +1 km, etc. On the left side of the picture (no anomaly), the contours 601 of the scaled amplitude (Amplitude×Frequency$^{-1.5}$) are straight lines, almost parallel to the Y-axis. On the right side of the picture, the contours 602 are bent between the offset lines 608 and 607 corresponding to 1 and 3 km-offset. The presence of the resistive anomaly is now clearly indicated.

Figure 7:
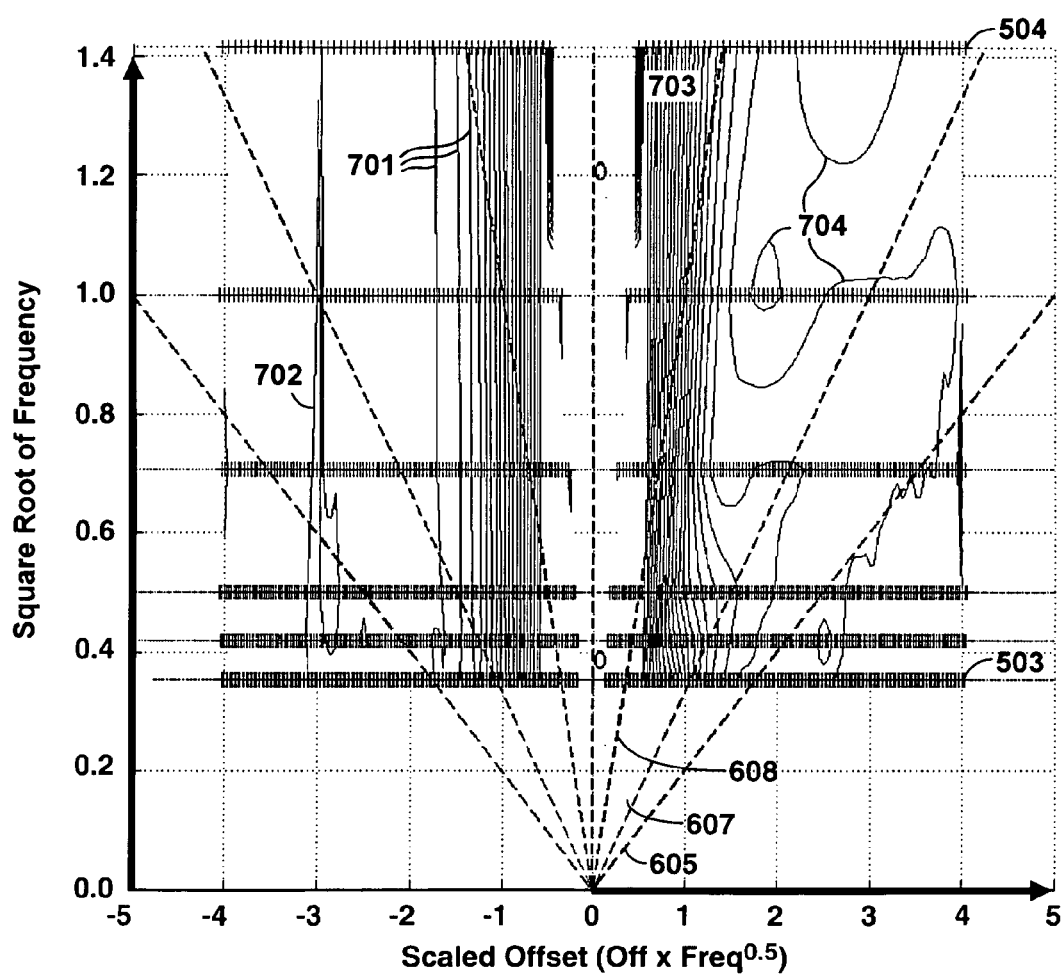
FIG. 7 is a contour map displaying an attribute (gradient of scaled amplitude) in the scaled offset/scaled frequency plane.

In this Scaled Offset–Scaled Frequency plane, it is possible to compute map attributes, like gradient, azimuth, first derivative, second derivative etc. to highlight subtle variations in the phase and amplitude of the data. FIG. 7 shows the gradient of the scaled amplitude, represented as the parameter in the parametric family of plots (same data as in FIGS. 1A-B, 4A-B, 5 and 6). On the left side (no anomaly), the close vertical contours 701 for the short scaled-offsets correspond to the initial steep curves of amplitude. Then, for further scaled-offsets 702, the gradient contours are more spaced but they are still almost vertical, i.e. almost parallel to the Y-axis. On the right side the same initial steep gradient is observed for short scaled-offsets 703 until the resistivity anomaly effect is felt (704).

Figure 8:
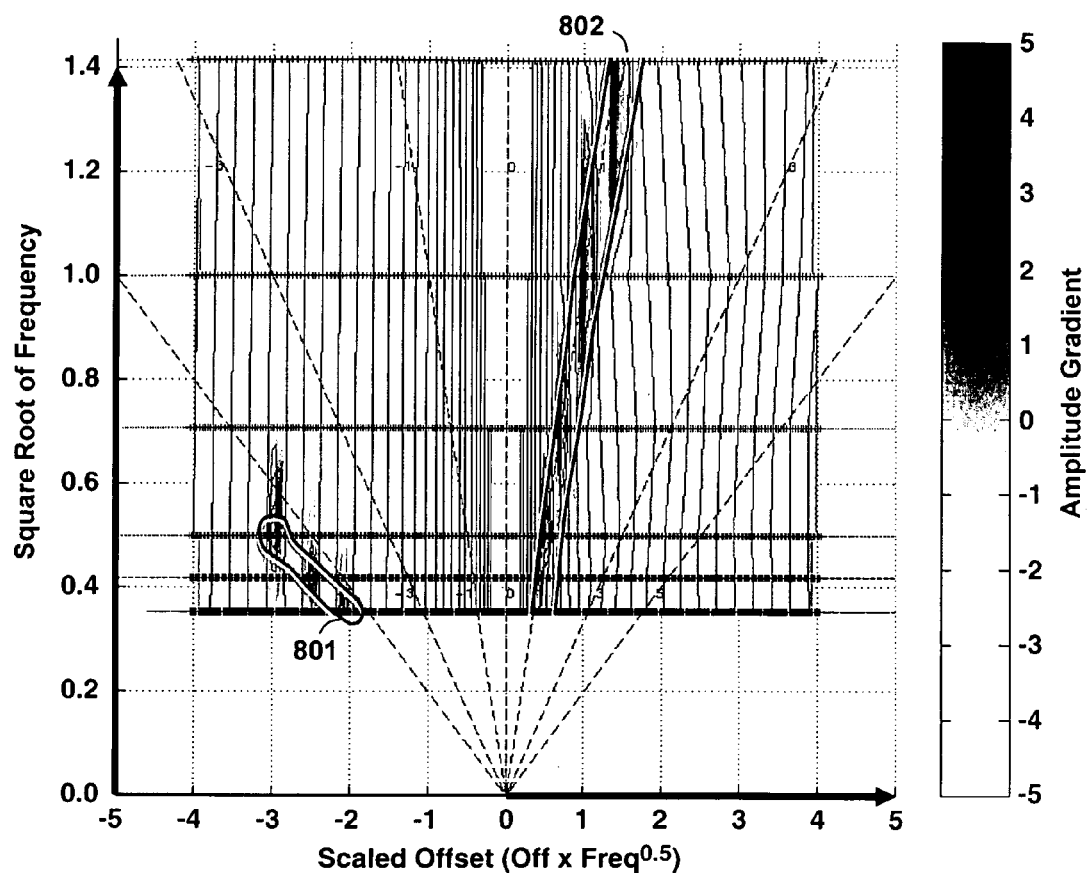
FIG. 8 is a map in which scaled amplitude and gradient of scaled amplitude are co-rendered in the scaled offset/scaled frequency plane.
Figure 9:
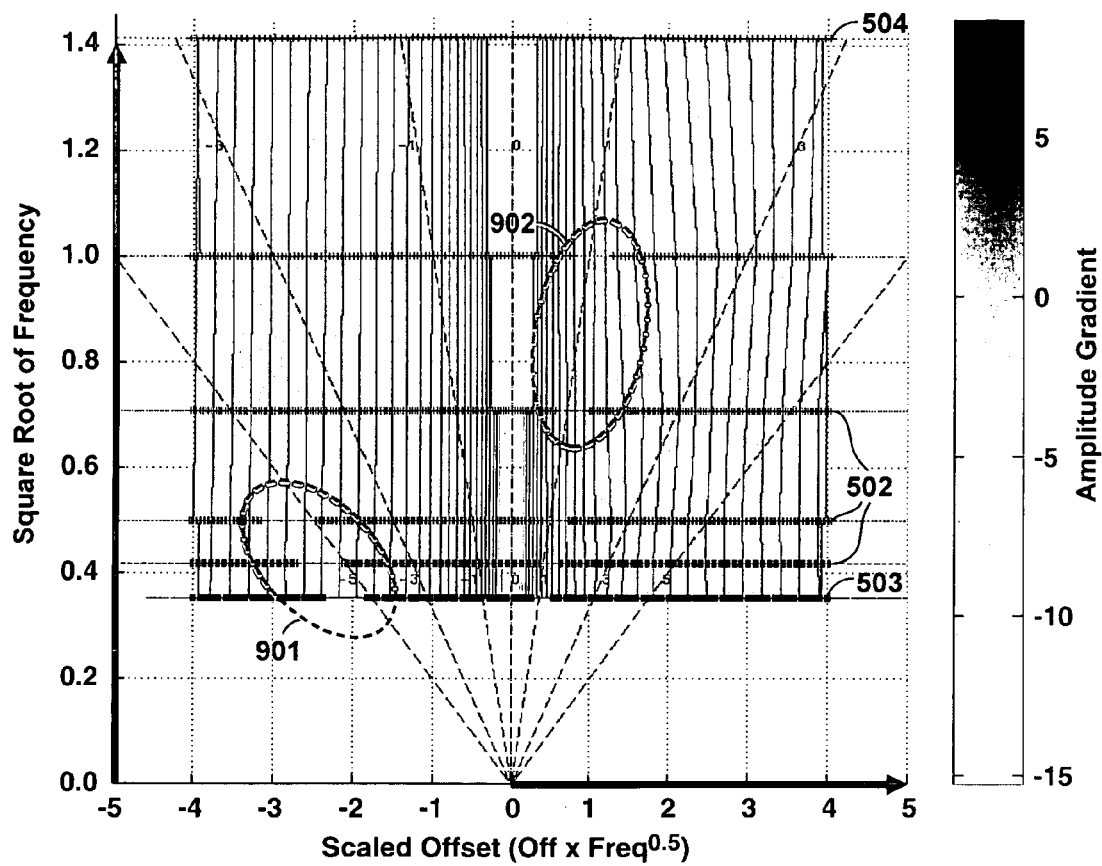
FIG. 9 is the map of FIG. 8, after muting out noise.

Of course, data displays such a FIG. 7 can and typically will be co-rendered with attribute information represented in a continuous way by a color scale instead of parametrically by contour lines. This is quite helpful in detecting data problems. In FIG. 8, the contours of the scaled amplitude are co-rendered with the color-coded (gray scale substituted for patent purposes) gradient (data come from another receiver). There is some noise in polygons 801 and 802. Those polygons can be interactively drawn on the picture and the noisy data can be muted out. FIG. 9 shows the figure after muting. Interruptions within ovals 901 and 902 of the data at the discrete frequencies 502 show where the data were muted. The contour lines are interpolated across the missing data. Such a scaled plot display enables the user to manipulate data from different frequencies at the same time.

Figure 2A:
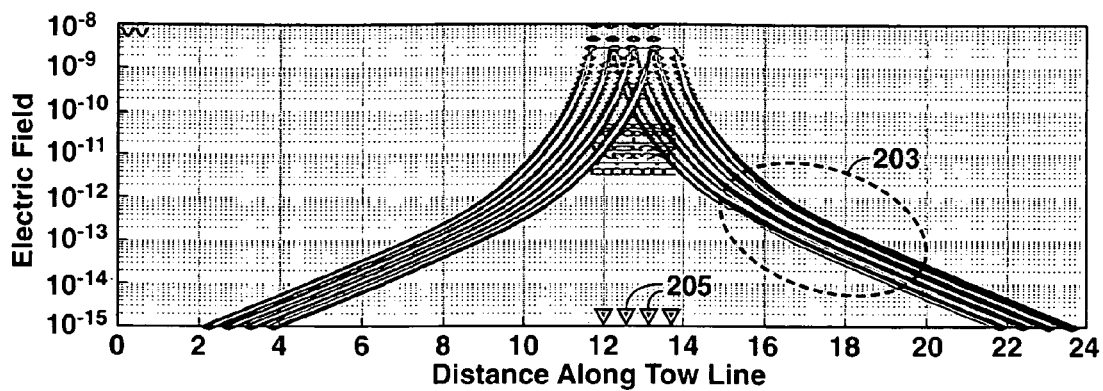
FIGS. 2A-C are conventional plots at three source frequencies displaying data from four different receivers along a source tow line on the same plot.
Figure 2B:
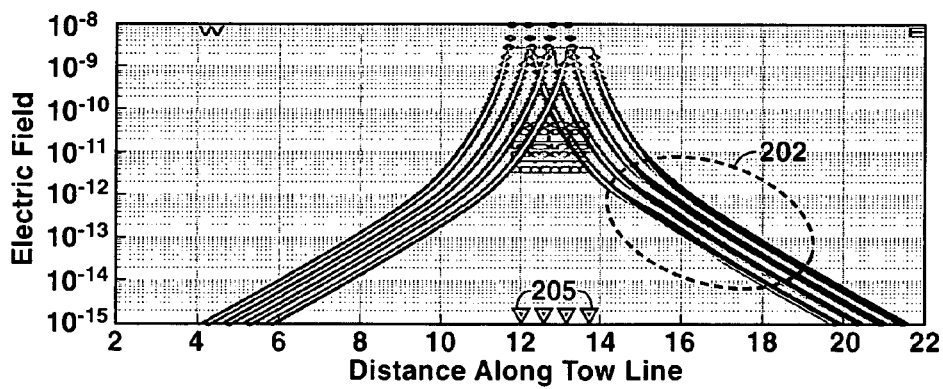
Figure 2C:
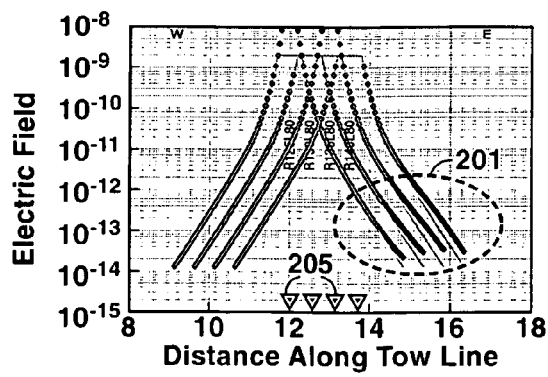
Figures 3A, 3B, 3C:
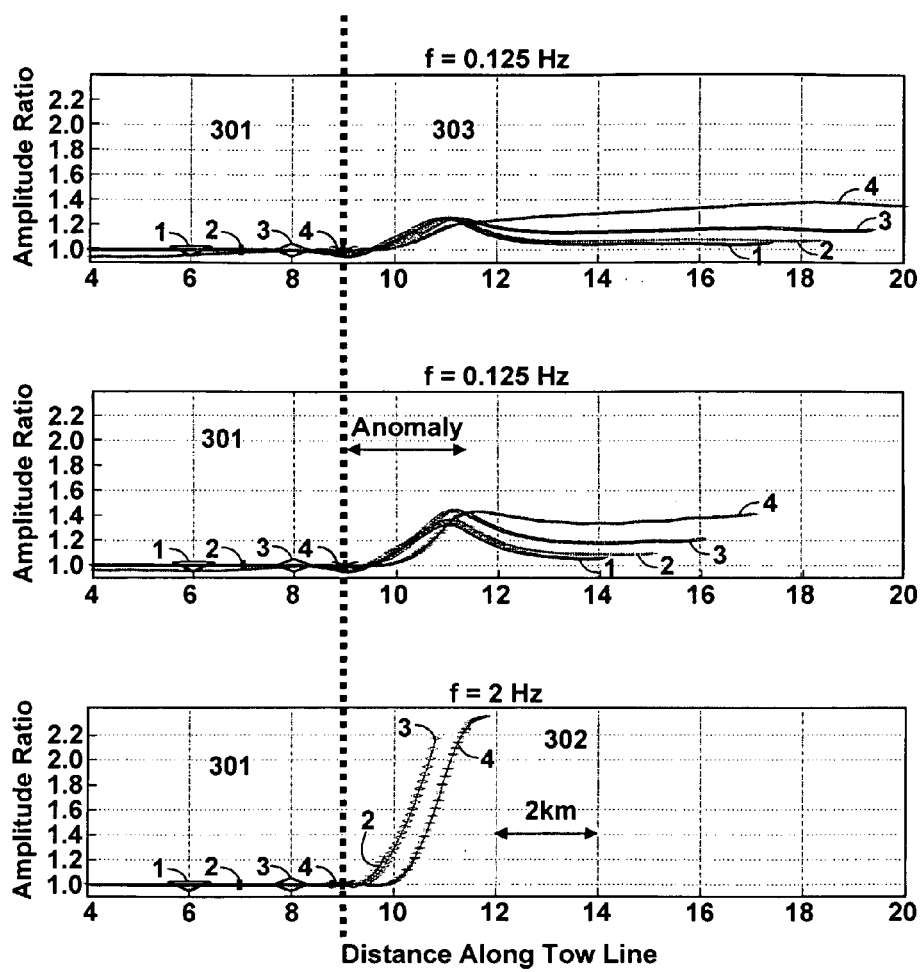
FIGS. 3A-C are amplitude ratio plots at three different frequencies.
Figure 10:
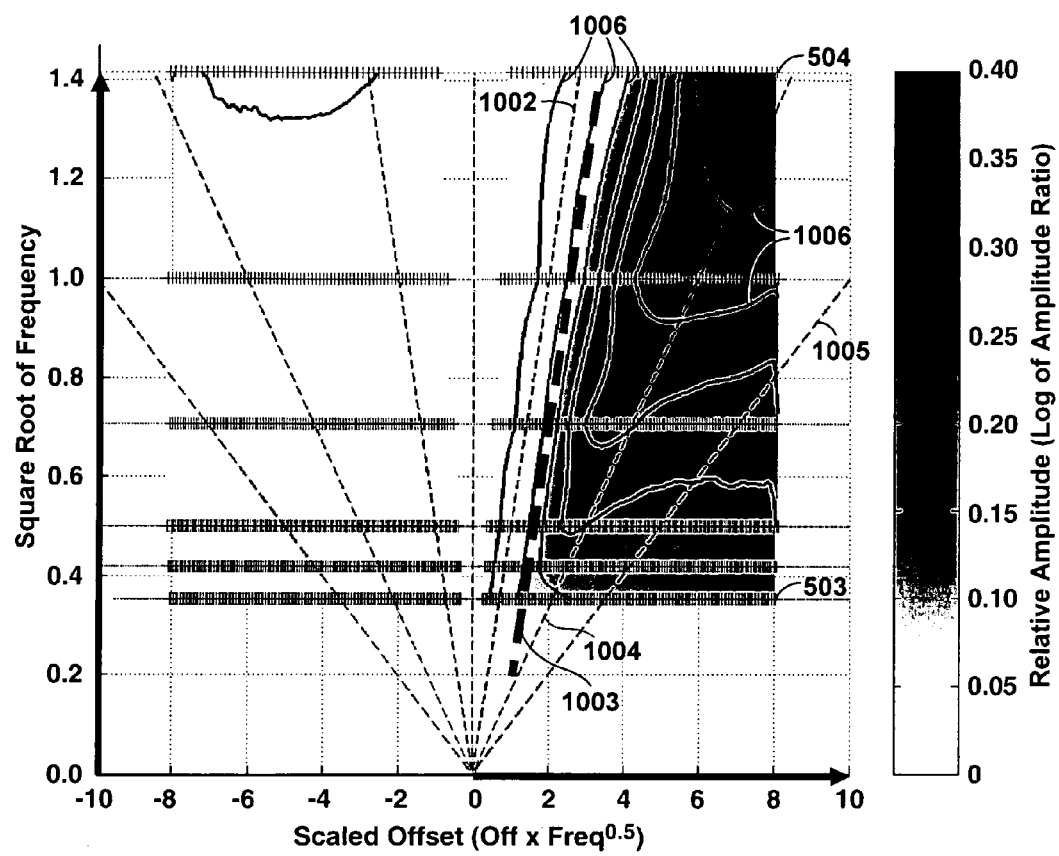
FIG. 10 is a map of relative amplitude in the scaled offset/scaled frequency plane.

Although the display of FIG. 6 represents a considerable improvement over previous methods for anomaly detection and interpretation, another embodiment of the present inventive method is typically even better. That embodiment is a display of the ratio between the amplitude of the observed data to a reference amplitude (or the difference between the phase of the data and the phase of the reference) in the Scaled Offset–Scaled Frequency plane, as illustrated in FIG. 10. FIG. 10 is based on the same electric field data as in FIGS. 2 and 3 plus data corresponding to three additional frequencies. On the left side of the display (negative offsets), the logarithm of the amplitude ratio (also called relative amplitude) is very close to zero, as indicated by the gray scale. The observed data are very close to the reference data, indicating that there is no resistivity anomaly. On the right side, the anomaly is obvious, even without comparison to the left side, or even if both sides looked the same. Thus, resistive anomalies can be identified from the shape of the contours or from color differences when comparing positive offset data to negative offset data on a plot such as FIG. 10 or, more generally, when comparing different receiver locations on the plot. Note how well the colors (gray shades) and contours are organized across scaled offset and scaled frequency in FIG. 10. Such an organization was not clear in FIGS. 2 and 3.

The relative amplitude contours 1006 are fairly parallel in the vicinity of the 1 km-constant-offset oblique line 1002 (referred to as 608 in FIG. 7). Even if the exact location of the zero-contour is not easy to pick because of noise, the direction of these contours is a very robust piece of information. They are aligned with the 1.2 km constant offset line 1003 (thick black broken line). This distance of 1.2 km is herein called the electric distance between the receiver and the anomaly. In this case, the anomaly edge is directly below the receiver, 600 m below the sea floor. The electric distance is the geometric (straight line) distance between the receiver and the anomaly plus the distance between the anomaly and the transmitter (approximately the depth of the anomaly).

Figure 13:
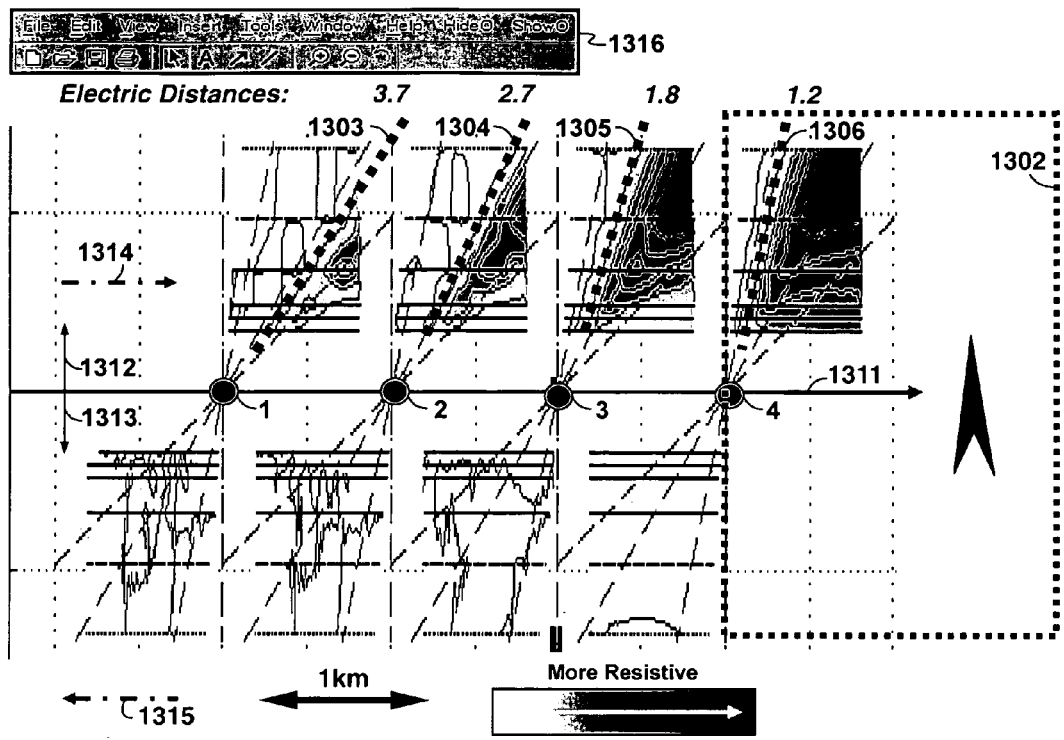
FIG. 13 is a multi-receiver map of relative amplitude in scaled offset/scaled frequency space.

This relationship can be inferred from plots such as FIG. 10. It can be shown that the first contours have the same 1.2 km-slope for all the receivers above the anomaly (which is at a constant depth of 0.6 km in this example). If the anomaly were at a depth of 2 km, the first contours in the scaled-offset scaled-frequency plane would align along the 4 km direction (i.e., the 4 km constant offset line) for all the receivers above the anomaly. Thus, if the receivers are above the anomaly the contours are aligned to the twice-depth-of-the-anomaly direction. FIG. 13 will show that if the receivers are no longer directly above the anomaly, the first contours are aligned with the H+Z direction, where H is the closest distance between the receiver and the anomaly and Z the closest distance between the transmitter and the anomaly (roughly the depth of the anomaly (below the sea floor) because the transmitters are close to the sea floor. This relationship of the present invention seems to hold true as long as the shape of the anomaly is simple.

The maxima of the anomaly (darkest shade of gray) at each frequency are relatively well-aligned, almost parallel to the 3 km-constant-offset line 1004. This second electric distance fairly corresponds to the second edge of the anomaly—in fact the known anomaly length for this simulated data calculation is 2 km. Thus the difference between the first two electric distances (3−1.2=1.8 km) is a reasonable estimate of the length of the anomaly, i.e. the lateral dimension of the anomaly along the direction of the survey source's movement. Map attributes, such as the gradient, can help determine the most accurate location of the maxima.

A third electric distance corresponds to the third dimension of the anomaly (its width in this simple instance). However, it is usually not very well defined because the anomaly shape may be irregular and its effect starts to interfere with other potential anomalies and background variation. Nevertheless, it can be seen from FIG. 10 that there is a range of offsets beyond 3 km where the relative amplitude contours again have comparable orientation, and line 1005 is an estimate of the slope at which this occurs.

Figure 11:
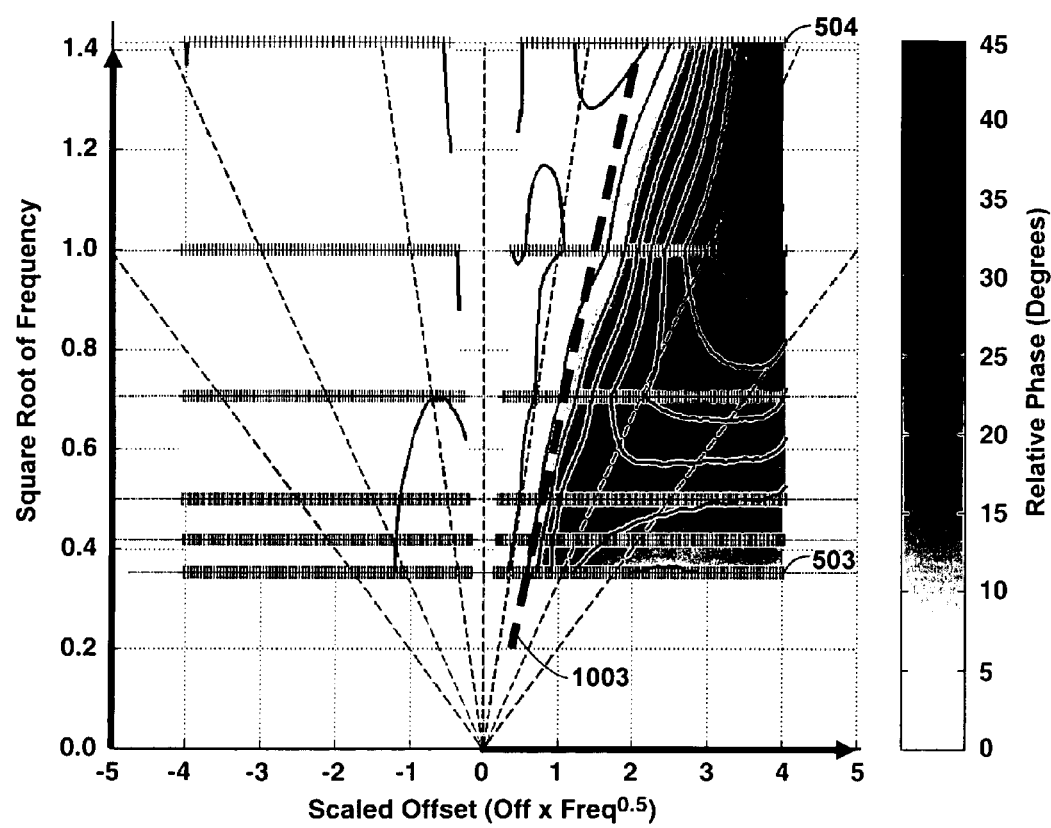
FIG. 11 is a map of relative phase in the scaled offset/scaled frequency plane.

FIG. 11 shows the relative phase (difference between the phase of the actual data and the phased of the reference) in the Scaled Offset–Scaled Frequency plane for the same receiver. While FIGS. 4A-B showed that the phase plot was superior to the amplitude plots, the relative amplitude plot of FIG. 10 is as good as the relative phase plot of FIG. 11. This fact is important because the amplitude information of actual data is usually much more reliable than the phase.

Figure 12:
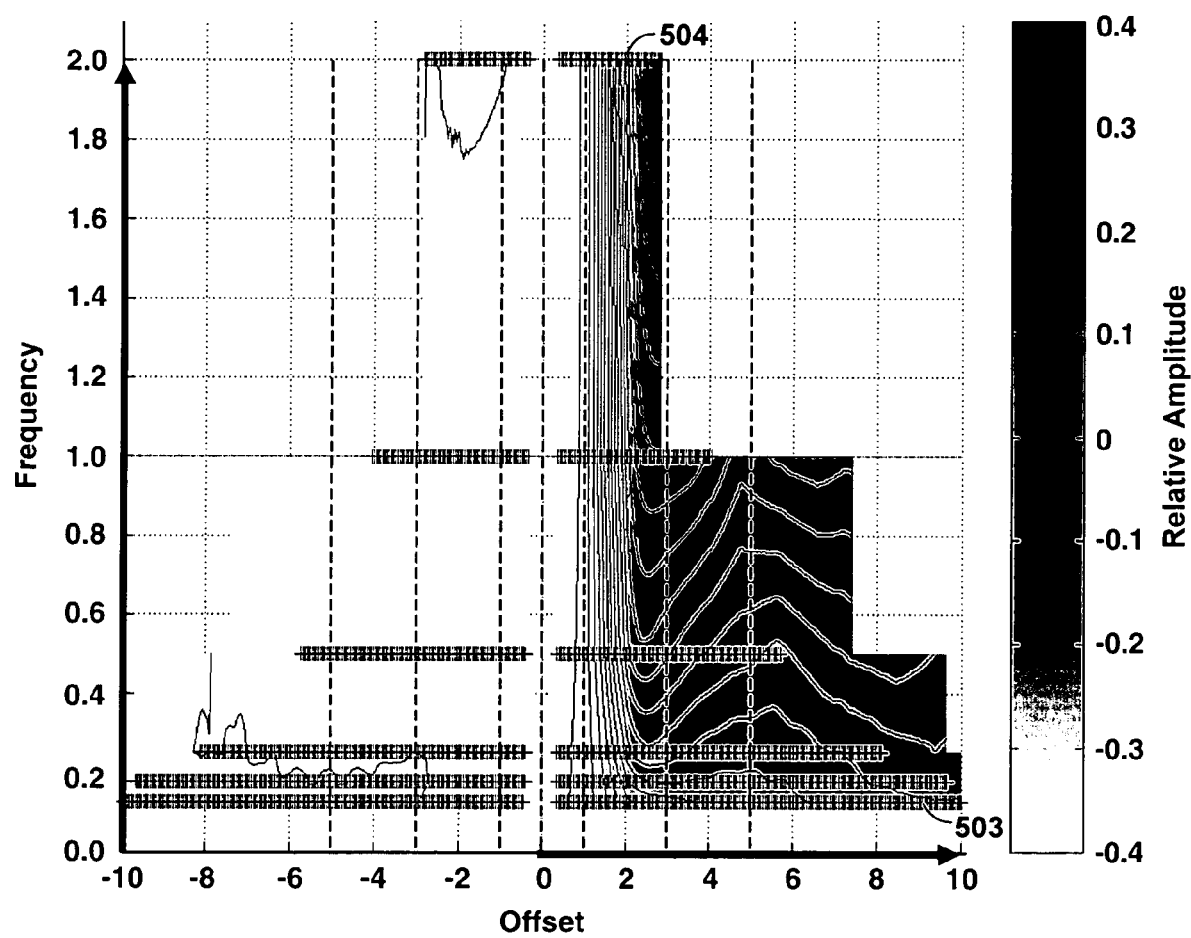
FIG. 12 is a map of relative amplitude in offset/frequency space.

FIG. 12 shows the contours of the relative amplitude in the Offset–Frequency plane. It is a better display than FIGS. 3A-C, but the first electric distance is not easy to pick from the zero-contour. FIG. 12 is an example of an embodiment of the present inventive method in which relative amplitude is displayed in a Scaled Offset/Scaled Frequency plane, but instead of the scale exponents ½, ½ of the preferred embodiment, this embodiment uses exponents 0, 1. It can readily be seen from this that it is advantageous to display data in the preferred scaled offset/scaled frequency plane (Offset×Frequency$^{0.5}$/Frequency$^{0.5}$) of the present invention.

The individual graphs of relative amplitude in the Scaled Offset–Scaled Frequency plane for each receiver can be plotted together on a true geographic base-map as in FIG. 13. Four receivers 1-4 are plotted at their true geographic location and the scaled offset–scaled frequency graphs are displayed along the tow line direction 1311. Positive offsets (i.e., in the direction of the tow) are displayed to port (1312). Negative offsets (i.e., in the opposite direction from the tow) are displayed to starboard (1313). The scaled-offset and scaled frequency true values are further scaled as may be needed to minimize over-posting. For instance, one can make sure that the new maximum value of the scaled-offset is less than the average distance between receivers and that the new maximum value of the scaled frequency is smaller than half the average distance between tow lines.

If the data density is high, for instance at lines crossings, the display software can be such that the user can interactively hide or re-show individual graphs. For example, pushing the HideO button on the tool bar 1316, then clicking on the receiver location and on the desired line towards the positive (1314) or negative (1315) offsets will hide the selected graph and temporarily simplify the map presented in the display of FIG. 13. Pushing the ShowO button will show the selected graph again. Other ways of co-rendering the results of the present inventive method will occur to skilled users.

The anomaly in this simulated example is 600 m deep below the sea floor and located immediately east of receiver 4; the anomaly outline is indicated by reference number 1302. Negative offsets (direction 1315, away from the anomaly) show only the zero-contour, i.e. log of relative amplitude is zero. On the positive (1314) offsets, the intensity of the anomaly increases for receivers closer to the edge of the anomaly. This is as would be expected.

Figure 14:
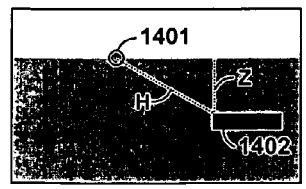
FIG. 14 illustrates calculation of the electric distance between a receiver and a resistive body causing and anomaly in the survey data.
Figure 15:
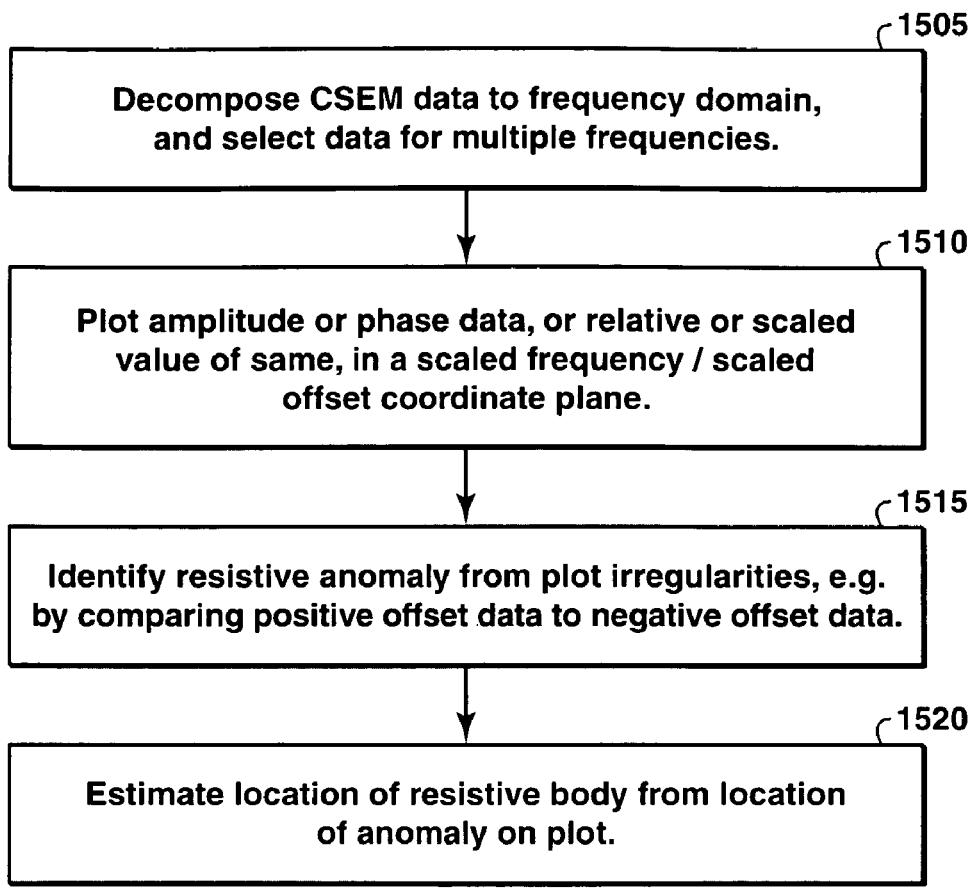
FIG. 15 is a flow chart showing basic steps in one embodiment of the present inventive method.

Measurements made at a given receiver cannot reflect the presence of a resistive body lying east of the receiver for source positions west of the receiver (negative offsets). Thus the negative offset data will reflect background. Positive offset measurements will reveal the anomaly for offsets sufficiently long. The closer a receiver is to the resistive body, the shorter the offset required to reveal the onset of the anomaly and the greater the measurement (gray shading) of the anomaly. The thick, black dotted lines 1303-1306 corresponding to the first electric distance gets steeper from receiver 1 to 4. As illustrated in FIG. 14, the electric distance is equal to the distance H between the receiver 1401 and the closest edge of the anomaly (resistive body) 1402 plus the depth Z of the anomaly; i.e., electric distance=H+Z. The offset value corresponding to each of the lines 1303-1306 can be determined in scaled offset–scaled frequency space from the slope of the line. The electric distances calculated from the measured slopes for receivers 1-4 are 3.7, 2.7, 1.8 and 1.2 km, respectively. These values can be shown to agree with values calculated from the known position and depth of the resistive body using the equation electric distance=H+Z.

More receivers and more lines (parallel and crossing lines) could be displayed on maps like FIG. 13. Such maps are a very convenient way to display and interpret a large amount of data.

The foregoing application is directed to particular embodiments of the present invention for the purpose of illustrating it. It will be apparent, however, to one skilled in the art, that many modifications and variations to the embodiments described herein are possible. All such modifications and variations are intended to be within the scope of the present invention, as defined in the appended claims. Persons skilled in the art will recognize that mapping of CSEM data by the present inventive method is best displayed with the aid of a computer, i.e. the invention is computer implemented in its preferred embodiments. In such instances, the resulting anomaly maps may be either downloaded or saved to computer memory.

The invention claimed is:

1. A hydrocarbon prospecting method for displaying electromagnetic field data from a controlled source electromagnetic survey of a subsurface region to enhance identification of resistive anomalies in the subsurface region, thereby locating resistive bodies causing the anomalies, comprising:
   (a) decomposing electromagnetic data from at least one survey receiver into frequency domain, and selecting amplitude data corresponding to at least two frequencies;
   (b) plotting the selected amplitude data with a scaled amplitude plotted on one axis vs. a scaled offset, where offset is source-receiver separation, on the other, with scale factors being chosen to substantially collapse data from the two or more frequencies to a single curve; and
   (c) identifying one or more resistive anomalies by comparing positive offset data to negative offset data; and
   (d) estimating location of a resistive body and potential hydrocarbon source that is causing an anomaly from location of the anomaly on the plot relative to location of the survey receivers.

2. The method of claim 1, wherein the scaled offset is offset multiplied by the frequency raised to a first selected power (offset×$f^{p1}$) and the scaled amplitude is amplitude multiplied by frequency raised to a second selected power (amplitude×$f^{p2}$).

3. A hydrocarbon prospecting method for displaying electromagnetic field data from a controlled source electromagnetic survey of a subsurface region to enhance identification of resistive anomalies in the subsurface region, thereby locating resistive bodies causing the anomalies, comprising:
   (a) decomposing electromagnetic data from at least one survey receiver into frequency domain, and selecting amplitude or phase data corresponding to at least two frequencies;
   (b) plotting a quantity representing the selected electromagnetic field data represented on the plot by contours or color scale on a coordinate plane where the axes are corresponding scaled frequency and scaled offset, where offset is source-receiver separation, with scale factors being chosen to produce substantially vertical contours, where vertical means parallel to frequency axis, in offset ranges not impacted by resistive anomalies;
   (c) identifying one or more resistive anomalies from the plot; and
   (d) estimating location of a resistive body and potential hydrocarbon source that is causing an anomaly from location of the anomaly on the plot relative to location of the survey receivers.

4. The method of claim 3, wherein the one or more resistive anomalies are identified from the shape of the contours or from color differences when comparing positive offset data to negative offset data on the plot or when comparing different receiver locations on the plot.

5. The method of claim 3, wherein the scaled offset is offset multiplied by the frequency raised to a first selected power (offset×$f^{p1}$) and the scaled frequency is frequency raised to a second selected power.

6. The method of claim 5, wherein the first selected power is ½ and the second selected power is ½, and further comprising identifying at least one constant offset oblique straight line in the plot passing through the point representing zero offset and zero frequency, said straight line being identified as separating a portion of the plot indicating background and a portion of the plot indicating an anomaly or identified as passing through a peak of the anomaly.

7. The method of claim 6, further comprising calculating position and depth of a resistive body from the offset values of the constant offset oblique lines that were identified, said offset values being computed from measured slopes of the identified constant offset oblique lines.

8. The method of claim 7, wherein the position and depth calculation uses the following relationship:

$$\text{electric distance} = H + Z$$

where Z is depth of the resistive body below survey receiver level, H is straight line distance from a receiver to the nearest edge or corner of the resistive body, and electric distance is an offset value of an identified constant oblique line.

9. The method of claim 8, wherein the quantity representing the selected electromagnetic field data is the logarithm of a relative data amplitude, being relative to a background reference, and said identified constant oblique line is a line defining a transition from a zero relative amplitude region to a non-zero relative amplitude region in the plot.

10. The method of claim 9, further comprising identifying a second constant offset oblique straight line in the plot corresponding to maximum relative amplitude values, and calculating a second electric distance as equal to the constant offset of the second oblique line, and estimating a dimension of the resistive body as the difference between the two electric distances.

11. The method of claim 3, wherein the quantity representing the selected electromagnetic field data is a scaled amplitude equal to amplitude×(frequency)$^{P3}$, where P3 is a third selected power.

12. The method of claim 3, wherein the quantity representing the selected electromagnetic field data is a relative data amplitude or phase, being relative to a selected reference.

13. The method of claim 12, wherein relative amplitude is amplitude of selected electromagnetic field data divided by a selected reference amplitude, or some function of that amplitude ratio such as the logarithm of the amplitude ratio.

14. The method of claim 13, wherein the selected reference amplitude is an amplitude value representative of portions of the subsurface region containing no anomalies, i.e. background.

15. The method of claim 12, wherein relative phase is the difference between actual phase and an arbitrary reference phase.

16. The method of claim 3, wherein the scaled-offset axis is parallel to a survey source movement line.

17. The method of claim 3, further comprising co-rendering in a display maps (plots from step (b)) for a plurality of receivers whose locations fall on the scaled-offset axis, and using this multi-receiver map in step (c).

18. The method of claim 17, wherein positive-offset data are plotted in one half (upper half or lower half) of the multi-receiver map, and negative-offset data are plotted in the other half.

19. The method of claim 18, wherein said co-rendered display has capability to temporarily turn off data corresponding to individual receiver positive or negative offset data to simplify the display and facilitate resolution of over-posting conflicts.

20. The method of claim 3, wherein the survey is conducted with a plurality of stationary receivers and a moving source, said source moving in one or more straight lines with a plurality of receivers aligned along each source line.

21. The method of claim 3, wherein the quantity representing the selected electromagnetic field data is an electromagnetic field data attribute.

22. The method of claim 19, wherein the attribute is gradient of a scaled amplitude, where scaled amplitude=amplitude×(frequency)$^{-1.5}$.

23. The method of claim 22, further comprising co-rendering on the same plot with the gradient a second quantity representing the selected electromagnetic field data.

24. The method of claim 23, wherein the second quantity representing the selected electromagnetic field data is a scaled amplitude, where scaled amplitude=amplitude×(frequency)$^{-1.5}$.

25. A method for producing hydrocarbons from a subsurface region, comprising:
 (a) conducting a controlled-source electromagnetic survey of the subsurface region;
 (b) obtaining a map of survey results, said map prepared by steps comprising:
  (i) decomposing electromagnetic data from at least one survey receiver into frequency domain, and selecting amplitude or phase data corresponding to at least two frequencies;
  (ii) plotting a quantity representing the selected electromagnetic field data represented on the plot by contours or color scale on a coordinate plane where the axes are corresponding scaled frequency and scaled offset, where offset is source-receiver separation, with scale factors being chosen to produce substantially vertical (parallel to frequency axis) contours in offset ranges not impacted by resistive anomalies;
  (iii) identifying one or more resistive anomalies by comparing positive offset data to negative offset data or by comparing other different receiver locations on the plot; and
  (iv) estimating location of a resistive body and potential hydrocarbon source that is causing an anomaly from location of the anomaly on the plot relative to location of the survey receivers;
 (c) drilling a well and completing it into the located resistive body; and
 (d) producing hydrocarbons from the well.

* * * * *